United States Patent Office 3,291,858
Patented Dec. 13, 1966

3,291,858
THERMOSETTING RESIN BASED PAINTS CONTAINING A POLYESTER PREPARED BY REACTING PHTHALIC ANHYDRIDE, GLYCEROL, AND GLYCIDYL ESTERS OF ALPHA-BRANCHED SATURATED MONOCARBOXYLIC ACIDS WITH EITHER AN AMIDE-ALDEHYDE OR A PHENOL-ALDEHYDE RESIN
Hendricus A. Oosterhof and Klaas Ruyter, Amsterdam, Netherlands, assignors to Shell Oil Company, New York, N.Y., a corporation of Delaware
No Drawing. Filed Sept. 6, 1963, Ser. No. 307,029
Claims priority, application Netherlands, Oct. 3, 1962, 283,869
6 Claims. (Cl. 260—842)

The invention relates to a process for the preparation of thermosetting resin-based paint systems. More particularly, the invention relates to the preparation of paint systems based on polyester and/or polyether resins having at least one hydroxyl group per molecule.

Specifically, the invention provides a process for preparing coating compositions which comprises mixing and reacting (1) a polyester and/or polyether resin having at least one hydroxyl group per molecule and (2) an amino-aldehyde and/or phenol-aldehyde resin in the presence of halides, said halides being selected from Lewis acids, complexes thereof and salts of these complexes.

It is desirable and necessary under many circumstances to cure or stove polyester and/or polyether resin-based paint systems at low temperatures. In general, pigmented polyester-based paints require stoving at temperatures of 150° C. and upward and the pigmented polyether-based paints require stoving at 180° C. and higher. Lower stoving temperatures result in loss of some film properties.

It has now been unexpectedly discovered that these stoving temperatures may be substantially reduced by the use of a small amount of halide catalyst selected from Lewis acids, complexes thereof and salts of these complexes.

The addition of these special catalysts not only results in lowering the stoving temperatures to more acceptable ranges without loss of ultimate film properties but also, in many instances, improves the properties, such as higher impact strength and flexibility. The catalysts are not removed from the resin. The storage stability of the catalyzed resins are as good as, or better than, the uncatalyzed resins.

It is therefore the primary object of the present invention to provide polyester and/or polyether-based paints which have lower stoving temperatures without the loss of ultimate film properties. This and other objects will become apparent from the following disclosure.

A Lewis acid as defined by Lewis is understood to be a compound capable of combining with a lone pair of electrons of another molecule, thus complementing the electron configuration of one of its atoms to a stable one. Halides which are Lewis acids also come within the group of compounds designated as "anhydro acids" by Werner. According to Werner's definition, these are neutral compounds whose central atom has an incomplete electron configuration. Such halides are also known as Friedel-Crafts catalysts. For a more complete discussion of Lewis acids, reference is made to G. N. Lewis and G. T. Seaborg, J. Am. Chem. Soc., 61, page 1886 (1939), and "Electronic Interpretations of Organic Chemistry," A. E. Remick, page 314 et seq, John Wiley & Sons, Inc. (1943).

Examples of halides that are Lewis acids would be the halides of beryllium, zinc, aluminum, boron, bismuth, tellurium, molybdenum and iron. Typical examples include, among others, beryllium dichloride, zinc dichloride, aluminum trichloride, aluminum tribromide, boron trichloride, boron trifluoride, stannous chloride, stannic chloride, titanium trichloride, titanium tetrachloride, zirconium tetrachloride, antimony trichloride, antimony pentachloride, bismuth trichloride, bismuth pentachloride, tellurium dichloride, tellurium tetrachloride, molybdenum pentachloride and ferric chloride. Mixtures and complexes of the above-mentioned halides are likewise very suitable for application according to the invention. The boron trifluoride-etherate complex, in particular, gives very good results.

The halides may be very conveniently incorporated in paint compositions during the mixing thereof. Preferably, a solution of the halide in a suitable solvent is used. A 10% solution in absolute ethanol has been found eminently suitable in most cases.

The amount of halide needed for the required effect may generally vary from 0.01 to 5% based on the total amount of resin taken for preparation. Higher or lower percentages may also be used, however. The curing temperature may vary from 20 to 200° C., depending on the type and composition of the resin to be cured. Preferably, curing is conducted at 80 to 150° C. Very good results have been obtained at curing temperatures between 100 and 135° C.

Since there is a relation between the amount of halide added and the curing temperature, these two quantities should be coordinated in order to gain optimum results. The values of these quantities may vary from case to case. In addition to the type of halide, the type and composition of the resins used also play a role here. With the catalyst amounting to between 0.05 and 2.5%, a curing temperature of 100 to 135° C. will often be very effective.

Examples of halides that may improve the impact resistance of the paint films are boron trifluoride-etherate and aluminum trichloride. By comparing the results of two paints, one containing 2% boron trifluoride and one uncatalyzed, and both cured at 120° C., it was found that as a result of adding halide, the impact resistance of the paint coat had risen by more than 40 units. The impact resistance of a paint containing 0.5% aluminum trichloride and cured at 100° C. was found to be more than 35 units higher than the impact resistance of an otherwise similar paint containing no halide and cured at 120° C.

Particularly suitable polyester resins with at least one hydroxyl group per molecule are the so-called alkyd resins. Such polyester resins are described in "The Chemistry of Synthetic Resins," Carleton Ellis, chapters 42–49, Reinhold Publishing Company (1935).

In general, alkyd resins are prepared by reacting polycarboxylic acids and/or anhydrides with polyhydroxy compounds and/or epoxy compounds. Those alkyd resins prepared from saturated aliphatic monocarboxylic acids, in which the carboxyl groups are attached to tertiary and/or quaternary carbon atoms, are preferred. The structure of such monocarboxylic acids imparts very attractive properties, particularly improved chemical resistance, to the alkyd resins.

Suitable such alpha-branched saturated monocarboxylic acids may be represented by the general formula

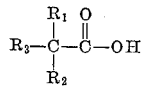

wherein $R_1$ and $R_2$ each represent the same or different alkyl radicals of normal, branched or cyclic structure and $R_3$ represents hydrogen or a hydrocarbyl radical. In the foregoing formula, $R_1$ and $R_2$ each may be a methyl, ethyl, propyl, butyl, pentyl, octyl, decyl, etc. radical. Hydrocarbyl radicals represented by $R_3$ comprise, for example, alkyl radicals of normal, branched or cyclic structure, including methyl, ethyl, propyl, butyl, pentyl, hexyl, octyl, as well as alkaryl, aralkyl and aryl radicals. Very suitable such monocarboxylic acids include the alpha, alpha-dialkyl monocarboxylic acids having from 4 to about 20 carbon atoms in the molecule. A preferred group comprises the acids possessing from about 9 to 19 carbons atoms with those acids having from 9 to 11 carbon atoms being especially preferred. A suitable method for their production is disclosed in copending applications Serial Nos. 858,796 and 858,797, filed December 10, 1959, now U.S. 3,059,005 and U.S. 3,059,006, both issued Oct. 16, 1962, and in U.S. 3,047,662.

As saturated aliphatic monocarboxylic acids in which the carboxyl group is attached to a tertiary or quaternary carbon atom, those monocarboxylic acids may well be used which are obtained by reacting formic acid or carbon monoxide and water, with olefins, or with paraffins in the presence of hydrogen acceptors such as olefins or compounds, such as alcohols and alkyl halides, from which olefins can be obtained by splitting off water or hydrogen halide, respectively, under the influence of liquid acid catalysts such as sulfuric acid, phosphoric acid or complex compositions of phosphoric acid, boron trifluoride and water. These saturated aliphatic monocarboxylic acids branched at the alpha position and prepared in this manner are usually called Koch acids in the art. Monocarboxylic acids branched at the alpha position can also be obtained according to Reppe's method. Of special value are the acids from monoolefins with 8 to 18 carbon atoms. Mixtures of olefins obtained by cracking paraffinic hydrocarbons, such as petroleum fractions, are preferably used as starting material. These mixtures may contain both branched and unbranched acyclic olefins as well as cycloaliphatic olefins. By the action of formic acid or of carbon monoxide and water, a mixture of saturated acylic and cycloaliphatic monocarboxylic acids is obtained therefrom.

The alkyd resin may be prepared by reaction between (1) A polycarboxylic acid, a polycarboxylic acid anhydride or a mixture thereof;
(2) A polyvalent hydroxy compound or an epoxy compound, or a mixture thereof, and
(3) A monocarboxylic acid in which the carboxylic acid group is directly attached to a tertiary and/or quaternary carbon atom.

Instead of actually reacting (2) and (3) separately, one can also react (1), entirely or partly, with esters obtained by the reaction of (2) and (3), for instance epoxy alkyl esters, such as glycidyl esters, or partial esters, such as monoglycerides.

Said monocarboxylic acids may be converted into suitable epoxy alkyl esters by methods described in copending application Serial No. 28,865, filed May 13, 1960, now U.S. 3,178,454, issued April 13, 1965.

Processes for the preparation of such suitable alkyd resins are described in copending application Serial No. 29,165, filed May 16, 1960.

One may, for example, use alkyd resins that have been obtained by reacting together polycarboxylic acids and/or anhydrides thereof, polyvalent alcohols and epoxy alkyl esters of branched monocarboxylic acids; or alternatively, two or more of the base materials may be reacted together and the other base materials may be added at a later stage.

Suitable polycarboxylic acids are dicarboxylic acids, for example, phthalic acid, isophthalic acid, terephthalic acid, adipic acid, maleic acid, dimerized fatty acids of drying oils and Diels-Alder adducts of maleic acid with dienes, such as terpenes, cyclopentadiene and hexachlorocyclopentadiene. Also, tricarboxylic acids such as citric acid, tricarballylic acid and trimellitic acid may be used. If desired, two or more of these acids may be used together. Preferably, anhydrides of these acids are used.

The preferred polyvalent hydroxy or epoxy compounds are those containing three or more hydroxy equivalents per molecule (one epoxy group being taken to be equivalent to two hydroxy groups). If desired, two or more of these compounds may be used together. Thus, trivalent hydroxy compounds may be used together wtih divalent hydroxy compounds. Examples of hydroxy compounds are glycerol, pentaerythritol, trimethylolpropane and 1,2,6-hexanetriol; and examples of epoxy compounds, are glycidol and diepoxybutane. Further examples are mixtures of glycerol with diethylene glycol, pentaerythritol with dipropylene glycol and glycidol with dipropylene glycol. A functionality of at least 3 is important for the preparation of polyesters which contain free hydroxyl groups.

Polyether resins with at least one hydroxyl group per molecule, which are suitable for use in the present compositions, are the epoxy resins. These resins may be obtained by reacting bivalent or polyvalent hydroxy compounds with epoxyhalogen compounds. Preferably, use is made of polyether resins obtained from bivalent phenols and epichlorohydrin. Examples of such polyether resins are glycidyl ether resins that may be prepared in various ways by reacting, for instance, 2,2-bis(4-hydroxyphenyl)-propane and epichlorohydrin when acted on by bases such as sodium hydroxide and potassium hydroxide. The resulting reaction products may be represented by the formula:

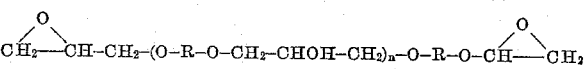

in which R represents a bivalent diphenylpropane radical and $n$ is a whole number, or, if the glycidyl ethers are mixtures of different components, may be a fraction.

The molecular weight, and hence also the value of $n$, entirely depends on the ratio of epichlorohydrin to diphenylolpropane employed for the preparation. This ratio may be so chosen as to produce glycidyl esters in which $n$ has, for example, the value of 2.0 or 3.7 or 8.8. The terminal groups in a number of the chains present may have the form of phenol groups derived from the bivalent phenol employed, while a proportion of the terminal glycidyl groups may also be present in hydrated form.

The preparation of suitable polyether and polyepoxy resins are described in "Epoxy Resins," Lee and Neville, McGraw-Hill Book Company (1957), and in U.S. 2,633,458, issued March 31, 1953, to Shokal. Preferred polyepoxides are those designated polyether A, B, C, etc., in U.S. 2,633,458, but not limited thereto.

In addition to polyester and/or polyether resins with at least one hydroxyl group per molecule, amino-aldehyde and/or phenyl-aldehyde resins are incorporated in the compositions to be prepared according to the invention, said resins co-reacting in the curing process.

The preparation and properties of suitable phenol-aldehyde and amino-aldehyde resins can be found in "The Chemistry of Synthetic Resins," Carleton Ellis, chapters 13–22 and 26–32, Reinhold Publishing Company (1935).

Although a number of aldehydes are suitable for preparation of the phenol-aldehyde and amino-aldehyde adducts, such as, for example, formaldehyde, acetaldehyde, butyraldehyde, benzaldehyde, and furfural; formaldehyde is preferred. Also, while phenol is preferred, other phenols, such as, for example, cresols, xylenols, ethylphenols, methylethylphenol, and trimethylphenols, may be employed. The phenol-aldehydes may be prepared by the well-known techniques wherein either acidic or alkali condensing catalysts are employed.

Suitable amino-aldehyde adducts include melamine-aldehyde and urea-aldehyde with melamine-formaldehyde and urea-formaldehyde being especially preferred. The ratio of polyester and/or polyether resins to the phenol-aldehyde, urea-aldehyde or melamine-aldehyde resin may be varied considerably. Suitable values for this ratio lie between 10:90 and 90:10. Very good resuits have been obtained by curing polyester and polyether resins with urea-formaldehyde resins in the proportion by weight of 70:30, and by curing polyester and polyether resins with melamine-formaldehyde resin in the proportion by weight of 80:20.

The invention is illustrated by the following examples. The reactants, their proportions and other specific ingredients of the formulations are presented as being typical and various modifications can be made in view of the foregoing disclosure without departing from the spirit or scope of the disclosure or of the claims. Unless otherwise specified, parts and percentages are by weight.

tion, 60 parts of a 50% solution of urea-formaldehyde resin (Setamine U.S. 603, marketed by Synthese, Holland) in a mixture of xylene and butanol (1:1) and 90 parts of titanium white were added in each test. The whole mixture was then thoroughly mixed in a ball mill for 48 hours. Finally, the mixtures produced were applied to thin metal sheets and stoved. Curing time in each case was 60 minutes. The amount of catalyst is given in percent by weight based on the total amount of resin, that is, including the urea-formaldehyde resin.

The properties of the paint coats were analyzed when the paint was four months old.

Table I

|  | Halide | | | | | |
| --- | --- | --- | --- | --- | --- | --- |
|  | None | 2% BF$_3$-etherate | 0.1% AlCl$_3$ | 0.5% AlCl$_3$ | 1% ZnCl$_2$ | 0.5% AlCl$_3$ |
| Stoving temperature, °C | 120 | 120 | 120 | 120 | 120 | 100 |
| Hardness, Buchholz | 56 | 91 | 111 | 118 | 105 | 100 |
| Impact resistance, in. lb | <1 | 40 | 12 | 16 | 10 | 35 |
| Bendable about a mandrel with diam. of, in | 1/16 | 1/16 | 1/16 | 1/16 | 1/8 | 1/16 |
| Penetration according to Erichsen, mm | 8.5 | 6.3 | 4.5 | 3.6 | 6.0 | 5.1 |
| Gloss | 85 | 78 | 65 | 65 | 55 | 85 |

EXAMPLE I

This example illustrates the use of Lewis acids (halides) in an alkyd/urea-formaldehyde paint formulation.

Impact resistance was determined in accordance with the British standard method; flexibility by bending a metal sheet coated with the paint round mandrels successively ¼, ⅛ and 1/16 inch in diameter and determining whether the coat of paint showed any cracks; and penetration by the Erichsen method, viz., pressing a metal ball slowly into a metal sheet coated with paint and supported about the point of contact by a ring, and determining how many mm. this ball could be pressed into the sheet before the coat of paint cracked. Gloss was measured by comparison with a black, mirror-glass plate.

The branched-chain monocarboxylic acids (C$_9$–C$_{11}$) were obtained by reacting cracked olefins containing 8 to 10 carbon atoms per molecule with carbon monoxide and water in the presence of a catalyst composed of phosphoric acid, boron trifluoride and water. They contained 9 to 11 carbon atoms per molecule, the carboxyl groups being attached to tertiary and/or quaternary carbon atoms. The sodium salts thereof were then converted into the glycidyl esters by reaction with epichlorohydrin.

A mixture of 740 parts of phthalic anhydride, 600 parts of glycerol and 130 parts of xylene was kept in a nitrogen atmosphere for 7 hours at 200–240° C. The water formed was continuously removed. After the mixture had been cooled to 150° C., 2220 parts of phthalic anhydride and 3630 parts of the glycidyl esters of monocarboxylic acids branched in the alpha-position were added. The mixture was then maintained at 150° C. for an additional 3½ hours.

A 50-percent solution in xylene was made up from the alkyd resins thus obtained. In a series of comparable tests the halides given in Table I were added, in the percentages given, to 140 parts of the solution in each instance. With the exception of boron trifluoride etherate, which was used undiluted, the halides were added in the form of a 10% solution in absolute ethanol. In addi- In experiments to ascertain storage stability of these paints, it was found that after a six-month storage at room temperature no abnormal rise in viscosity could be found over that exhibited by similar paints without the addition of halide. It is therefore evident that the storage stability of the present paints is quite satisfactory.

EXAMPLE II

This example illustrates the preparation and properties of a polyepoxide/urea-formaldehyde paint formulation wherein Lewis acids (halides) are employed.

The polyepoxide used in this example is a polyether prepared by reacting 2,2-bis(4-hydroxy phenyl) propane and epichlorohydrin by the process described in U.S. 2,633,458, and closely analogous to Polyether E referred to therein. This polyether resin has the following characteristics: Epoxy equivalent 1650–2050; equivalent weight 190; molecular weight 2900; $n=8.8$ (the meaning of $n$ can be found hereinbefore).

From this epoxy resin a 40% solution was prepared in a mixture of the ethyl ether of ethylene glycol acetate and toluene (1:1). In a series of comparable tests, small percentages of aluminum chloride as given in Table II, or none, as the case may be, were added in each instance to 175 parts of the solution. The aluminum chloride was added in the form of a 10% solution in absolute ethanol. In addition, 60 parts of a 50% solution of urea-formaldehyde resin (Setamine U.S. 603) in a mixture of xylene and butanol (1:1) and 90 parts of titanium white were added in each test. The whole mixture was then thoroughly mixed in a ball mill for 48 hours. Finally, the mixtures produced were applied to thin metal sheets and stoved at 135° C. The curing time of each of the resins is given in Table II.

The amount of aluminum chloride is given in percent by weight based on the total amount of resin, that is, including the urea-formaldehyde resin.

The properties of the coats were determined when the paint was one week old.

Table II

| | Halide | | | |
|---|---|---|---|---|
| | None | None | 0.5% AlCl₃ | 0.5% AlCl₃ |
| Stoving time, min | 30 | 60 | 30 | 60. |
| Hardness, Buchholz | 108 | 111 | 125 | 125. |
| Impact resistance, in. lb | <1 | <1 | 20 | 7. |
| Bendable about a mandrel with diam. of, in. | >1 | >1 | ¼ | ¼–½. |
| Penetration according to Erichsen, mm. | 0.3 | 0.3 | 3.7 | 1.8. |
| Gloss | 100 | 100 | 92 | 95. |
| Resistance to solvents: | | | | |
| After 2 min. in methyl ethyl ketone. | Very poor | Very poor | Excellent | Excellent. |
| After 5 min. in acetone | do | do | do | Do. |

EXAMPLE III

The procedure of Example I is essentially repeated wherein the polyester resin is an alkyd prepared by reacting phthalic anhydride, glycerol, and a non-drying vegetable fatty oil (Duraplex ND78 marketed by Rohm & Haas). Similar depressed stoving temperatures are obtained.

EXAMPLE IV

The procedure of Example II is substantially repeated wherein the polyepoxide is Polyether A of U.S. 2,633,458 and an equivalent amount of a melamine-formaldehyde resin (Uformite MM, Rohm & Haas) is used in lieu of the urea-formaldehyde resin. Essentially the same stoving temperature depression is achieved as in Example II with the concomitant improved physical properties.

EXAMPLE V

Substantially the same improved results are obtained when the urea-formaldehyde is replaced with an equivalent amount of a phenol-formaldehyde resin.

We claim as our invention:

1. A process for preparing coating compositions which comprises mixing and reacting at a temperature between 20 and 200° C. (1) a polyester resin prepared by reacting phthalic anhydride, glycerol and glycidyl esters of alpha-branched saturated monocarboxylic acids, said acids having the general formula

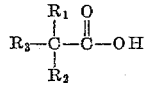

wherein $R_1$ and $R_2$ are alkyl radicals, $R_3$ is selected from the group consisting of hydrogen and alkyl radicals and $R_1$, $R_2$ and $R_3$ contain a total of from 2 to 18 carbon atoms, and (2) an aldehyde resin selected from the group consisting of amino-aldehyde and phenol-aldehyde resins in the presence of (3) halides, said halides being selected from the group consisting of Lewis acids, complexes thereof and salts of these complexes and being employed in amounts of from 0.01% to 5% by weight based on the total weight of the resins, the weight ratio of components (1):(2) being between about 10:90 and 90:10.

2. A process as in claim 1 wherein the polyester resin is an alkyd resin prepared by reacting phthalic anhydride, glycerol and glycidyl esters of alpha-branched saturated aliphatic monocarboxylic acids containing from 9 to 11 carbon atoms in the acid molecule.

3. A process as in claim 1 wherein the amino-aldehyde resin is a urea-formaldehyde resin.

4. A process as in claim 1 wherein the amino-aldehyde resin is a melamine-formaldehyde resin.

5. A process as in claim 1 wherein the halide is aluminum chloride.

6. A process as in claim 1 wherein the halide is boron trifluoride etherate.

References Cited by the Examiner

UNITED STATES PATENTS

| 2,504,100 | 4/1950 | Plank | 260—51 |
| 2,521,912 | 9/1950 | Greenlee | 260—831 |
| 3,013,906 | 12/1961 | Flowers | 260—75 |
| 3,142,686 | 7/1964 | Kreps | 260—348.6 |
| 3,227,665 | 1/1966 | Fourcade | 260—842 |

MURRAY TILLMAN, *Primary Examiner.*

SAMUEL H. BLECH, *Examiner.*

P. LIEBERMAN, *Assistant Examiner.*